United States Patent
Jarvis

(10) Patent No.: US 6,283,684 B1
(45) Date of Patent: Sep. 4, 2001

(54) DRILLING APPARATUS WITH CLAMPING MECHANISM

(75) Inventor: Robert Kenneth Jarvis, North Bend, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/474,201

(22) Filed: Dec. 29, 1999

(51) Int. Cl.$^7$ .................................................. B23B 39/00
(52) U.S. Cl. ........................... 408/103; 408/108; 408/110
(58) Field of Search .................... 408/56, 57, 58, 408/63, 13, 29, 30, 146, 69, 103, 104, 108, 110, 109

(56) References Cited

U.S. PATENT DOCUMENTS

| | | |
|---|---|---|
| 2,909,949 | 10/1959 | Winslow . |
| 4,157,231 * | 6/1979 | Phillips ................................ 408/1 R |
| 4,179,231 * | 12/1979 | Hadden ................................ 408/112 |
| 4,310,269 | 1/1982 | Neu et al. . |
| 4,538,942 | 9/1985 | Vindez . |
| 4,679,969 * | 7/1987 | Riley ...................................... 408/87 |
| 5,062,746 | 11/1991 | Deremo . |
| 5,161,921 * | 11/1992 | Corsi ................................... 408/1 R |
| 5,482,409 | 1/1996 | Dunning et al. . |
| 5,533,845 | 7/1996 | Glover . |
| 5,888,032 * | 3/1999 | Jensen .................................. 408/1 R |
| 5,961,258 * | 10/1999 | Ende et al. ............................ 408/103 |

* cited by examiner

Primary Examiner—Henry Tsai
(74) Attorney, Agent, or Firm—Alston & Bird LLP

(57) ABSTRACT

The apparatus includes a drill motor and a cutter drive mechanism coupled with the drill motor for rotating and advancing a rotary cutter along an axial direction, and a clamping mechanism having a pair of opposed clamping members and an actuator that moves the clamping members relatively toward and away from each other for clamping and releasing a workpiece. The actuator is a fluid-operated cylinder such as an air cylinder, and a fluid circuit associated with the cylinder is arranged such that in a normal state of the fluid circuit the cylinder urges the clamping members together to clamp the workpiece. The apparatus includes a control valve that can be operated to cause the fluid circuit to control the cylinder to move the clamping members apart. One or more springs are connected between the clamping members for constantly urging the clamping members together so that, in the event the cylinder ceases operating, the one or more springs maintain sufficient clamping force to keep the apparatus secured to the workpiece.

20 Claims, 3 Drawing Sheets

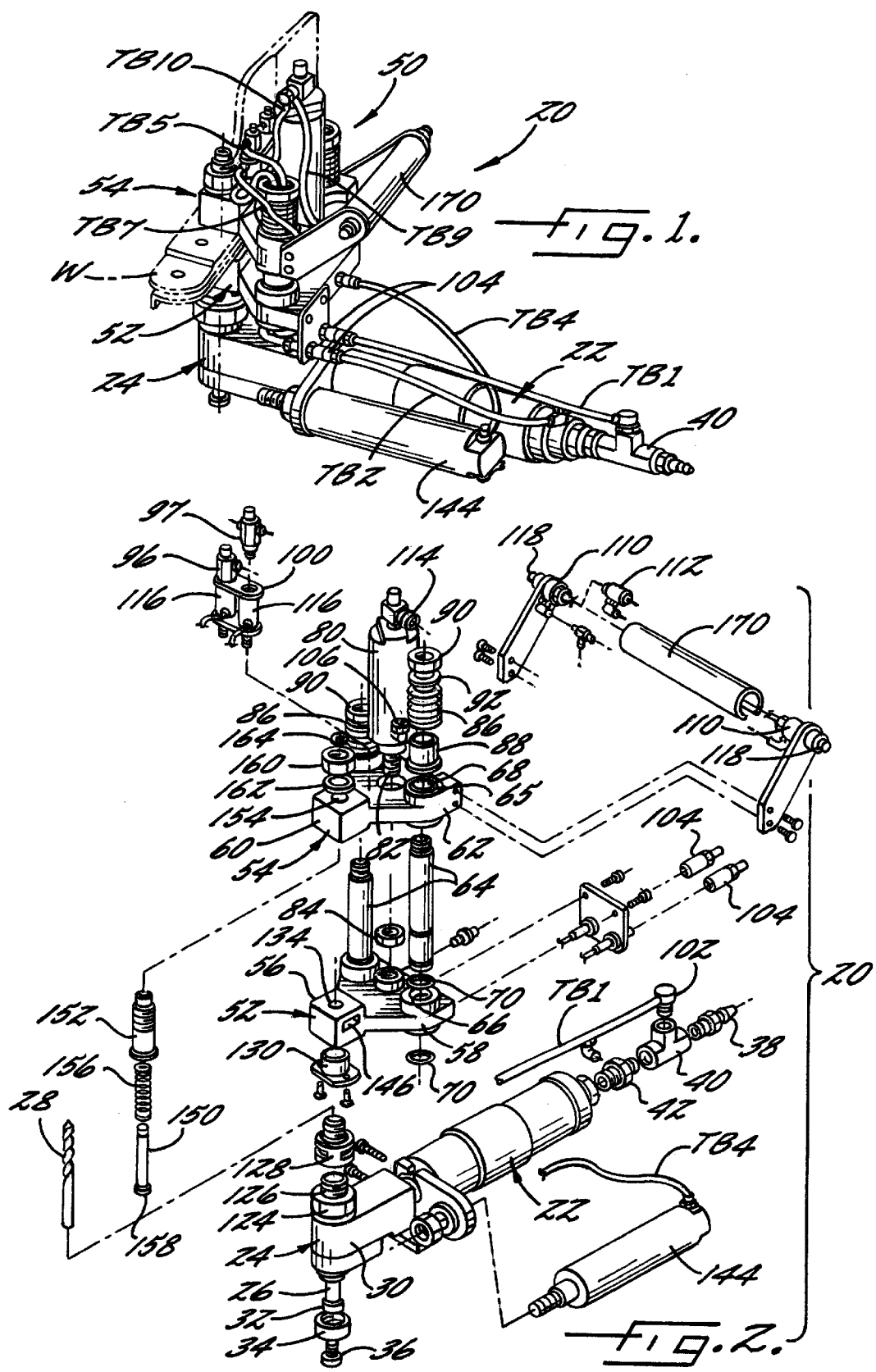

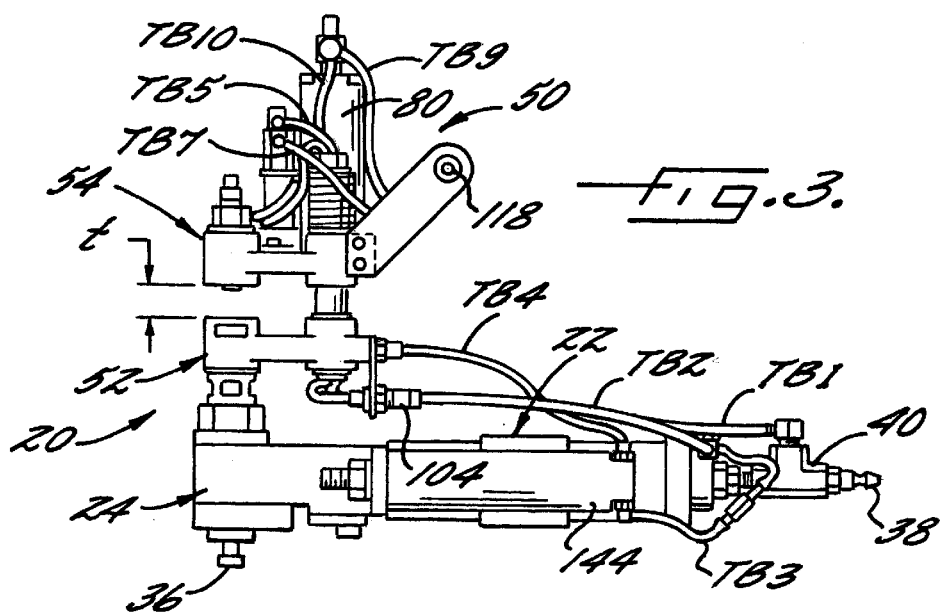
Fig. 3.
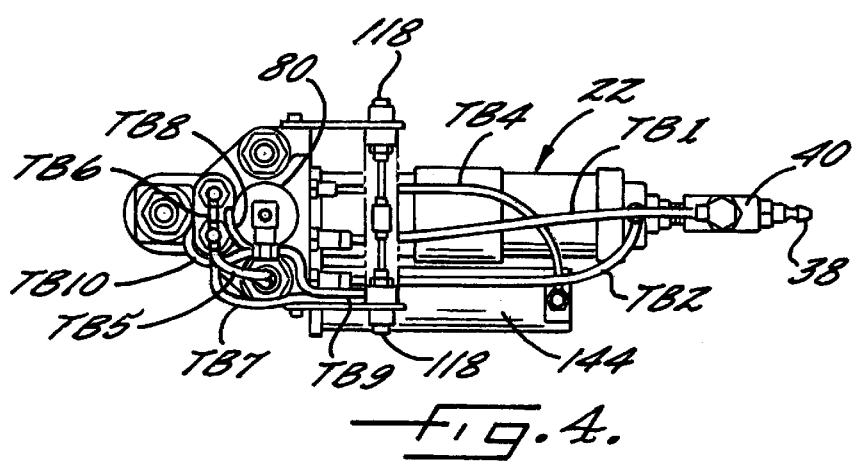
Fig. 4.
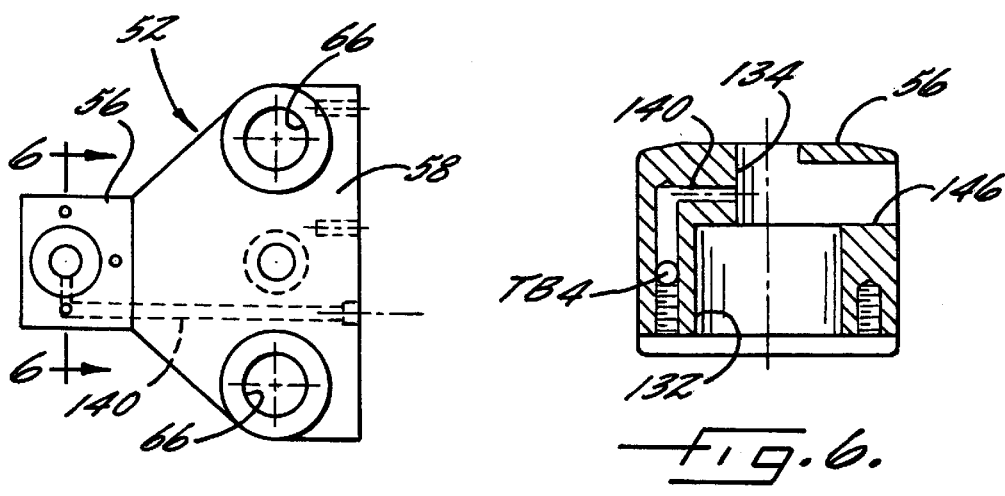
Fig. 5.
Fig. 6.

DRILLING APPARATUS WITH CLAMPING MECHANISM

FIELD OF THE INVENTION

The invention relates to devices for drilling, holes through workpieces. The invention relates more particularly to a device incorporating a clamping mechanism for clamping a workpiece between opposed clamping members and a drill mounted to the clamping mechanism for drilling a hole through the clamped workpiece.

BACKGROUND OF THE INVENTION

In many manufacturing processes, there is a need to drill a matched hole through two or more parts of a workpiece that are to be subsequently joined together by passing a fastener through the matched hole. For example, in the manufacture of aircraft structures, there is frequently a need to fasten stringers to other parts such as paddle fittings. In some circumstances, one of the parts to be joined may have pilot holes (i.e., holes that are located in the desired locations where fasteners are to be placed, but that are smaller in diameter than the fasteners) already formed in it, while the other part has no holes. Once the parts are positioned in abutting relation to each other in the positions in which they are to be fixed, a drilling apparatus is aligned with the pilot hole and is operated to drill a full-size hole through the parts.

In such a drilling process, difficulties are encountered in terms of fixing the parts so they do not move relative to each other during the drilling of the hole, and in terms of properly aligning the rotary cutter of the drill such that the cutter is advanced through the workpiece in the intended direction, which typically is normal to the surfaces of the workpiece. The drilling apparatus must also be as compact as possible so that it can fit into tight spaces between portions of the aircraft structure.

Various types of portable drilling devices having clamping mechanisms have been developed for both clamping and drilling workpiece parts. For example, U.S. Pat. No. 5,888,032 describes a paddle fitting tool for clamping and drilling a forked paddle fitting and wing spar. The clamping mechanism of the device employs a nut runner coupled to a drill by a saddle. The nut runner is operable to clamp the paddle fitting and wing spar so that the drill can drill a hole through the wing spar that is concentric with holes that are already formed through two forks of the paddle fitting between which the wing spar is disposed. A locator pin on one of the clamping members engages in the pre-formed hole of one of the forks so as to locate the apparatus in the proper location for drilling. The locator pin has a diameter that is equal to that of the drill bit, and is retractable into the clamping member so that the drill bit can drill through the hole in the paddle fitting fork if this hole is initially undersize. The device described in the U.S. Pat. No. 5,888,032 patent has several limitations. First, the nut runner assembly is bulkier, heavier, and more expensive than the air cylinders that are typically used for clamping mechanisms in paddle fitting tools. The operation of the nut runner is also relatively slow in comparison with an air cylinder, which is an important consideration in view of the very large number of holes that must be drilled in a typical aircraft structure. Additionally, the device is awkward in use because the feed engagement lever, which must be activated to cause feeding of the drill bit to drill a hole, is not located in an ergonomically friendly location in relation to where an operator would most naturally grasp the apparatus in use. Furthermore, experience with a commercial embodiment of a paddle fitting tool made in accordance with the '032 patent has shown that the drill bit tends to be damaged at a relatively high rate. The reasons for the damage are not fully known, but it is suspected that one cause may be flexing of the clamp plates as a result of high clamping force produced by the nut runner, which causes the drill bit to become misaligned relative to the locator pin. Yet another drawback of the device of the '032 patent is that cut chips produced during a drilling operation fly in all directions, making clean-up more difficult. A further disadvantage is that the clamping mechanism can be unclamped while the drill motor is operating, which can be a safety hazard.

In other types of paddle fitting tools, as noted above, air cylinders are used for providing the clamping force. Air cylinders offer several advantages in terms of small size, light weight, high speed of operation, and low cost. However, one drawback in prior drilling and clamping devices using air cylinders for providing the clamping force is that if for any reason the air cylinder ceases to operate, which can be caused for instance by a loss in air pressure, the clamping mechanism will stop functioning. This can be hazardous because the apparatus can unexpectedly fall from the workpiece. Accordingly, it would be desirable to provide a drilling and clamping apparatus that uses an air cylinder or the like for clamping but that avoids this known drawback.

SUMMARY OF THE INVENTION

The above needs are met and other advantages are achieved by the present invention, which provides a drilling apparatus for clamping and drilling a hole through a workpiece. The apparatus generally comprises a drill motor and a cutter drive mechanism coupled with the drill motor for rotating and advancing a rotary cutter along an axial direction, and a clamping mechanism having a pair of opposed clamping members and an actuator that relatively moves the clamping members toward and away from each other for clamping and releasing a workpiece. In a first aspect of the invention, the actuator is a fluid-operated cylinder such as an air cylinder, and a fluid circuit associated with the cylinder is arranged such that in a normal state of the fluid circuit the cylinder urges the clamping members together to clamp the workpiece. To unclamp the workpiece, the user operates a control valve, preferably by operating a switch located on the apparatus, which causes the fluid circuit to control the cylinder to move the clamping members apart. In one embodiment of the invention, one or more springs are connected between the clamping members for constantly urging the clamping members together so that, in the event the cylinder ceases operating, the one or more springs maintain sufficient clamping force to keep the apparatus secured to the workpiece. The cylinder overcomes the force of the spring(s) to move the clamping members apart for releasing the apparatus from the workpiece. Thus, the advantages of a fluid cylinder can be realized while avoiding the disadvantage of sudden loss of clamping force if the cylinder stops operating.

Preferably, the apparatus includes features enabling the drill motor assembly to be readily and quickly disconnected from the clamping mechanism to facilitate replacing the cutter or the drill motor. In one embodiment of the invention, the quick-disconnect features include quick-disconnect fluid couplings for connecting the fluid-operated cylinder and associated valves to the fluid supply line located on the drill motor assembly. The drill motor is connected to one of the clamping members by a quick-disconnect coupling, preferably a screw-type coupling that enables the drill motor to be removed from the clamping mechanism simply by unscrewing the coupling.

In a further embodiment of the invention, the apparatus includes a handle to facilitate grasping the apparatus for positioning it in relation to a workpiece, and the switch for activating the control valve to unclamp the clamping mechanism is located on or adjacent to the handle. More preferably, the fluid circuit includes two control valves in parallel, each having a switch located on opposite sides of the handle so that both right-handed and left-handed users can readily reach one of the switches while grasping the handle. Thus, the apparatus is ergonomically friendly and easy to operate in that the user can grasp the handle and easily operate the switch to unclamp the clamping mechanism so that the apparatus can be placed in position on a workpiece and, once the apparatus is in position, the user can simply release the switch to cause the clamping mechanism to clamp the workpiece.

Safety of the apparatus can be further enhanced in accordance with yet another embodiment of the invention, in which the fluid circuit includes a bypass valve for bypassing the control valve whenever the drill motor is operating. Accordingly, it is not possible in normal operation of the apparatus to unclamp the clamping mechanism while the drill motor is running.

In another aspect of the invention, the apparatus can include features for properly locating the apparatus relative to a pilot hole formed in a workpiece, and for improving life of the rotary cutter by preventing undesirable binding or interference between the cutter and other parts of the apparatus. More particularly, in one embodiment of the invention, the apparatus includes first and second opposed clamping members, and a cutter guide mounted on the first clamping member, the cutter guide receiving the cutter therethrough and guiding the cutter such that the cutter is advanced and retracted along a cutting axis that extends through the thickness of the workpiece clamped between the clamping members. The apparatus further includes a receptacle defined in the second clamping member for receiving an end portion of the cutter such that the cutter can drill a hole entirely through the thickness of the workpiece clamped between the clamping members, the receptacle being aligned along the cutting axis and having a diameter substantially larger than that of the cutter. A spring-loaded plunger is mounted in the receptacle for engaging a pilot hole formed in the workpiece so as to locate the apparatus in a proper location for drilling a hole. The plunger is movable into the receptacle by a tip of the advancing cutter as the tip breaks through the thickness of the workpiece and enters the receptacle. By making the receptacle diameter substantially larger than that of the cutter, any slight misalignment of the cutter that may occur will not result in the cutter coming into contact with the walls of the receptacle. Thus deleterious wearing away of the cutter tip can be avoided. Additionally, the cutter drive mechanism advantageously is of the positive feed, floating-spindle type, which allows some degree of lateral movement of the cutter as it is rotated and advanced, whereby the cutter can be aligned by the cutter guide without binding therein. The receptacle in the second clamping, member advantageously has a depth sufficient to allow the cutter to advance into the receptacle a substantial distance. This is advantageous because it allows the use of a constant feed stroke for the cutter while drilling workpieces of various thicknesses; when the workpiece has a relatively small thickness, a relatively greater lengthwise extent of the cutter is received into the receptacle.

In still further embodiments of the invention, the apparatus includes features for cooling and lubricating the rotary cutter and for exhausting cut chips so the chips do not fly in all directions during a drilling operation. Thus, the apparatus preferably includes a coolant passage formed in the first clamping member for spraying a cooling and lubricating fluid onto the cutter as it passes through the clamping member. The apparatus preferably also includes a chip exhaust port formed in the first clamping member for exhausting cut chips. Advantageously, the apparatus includes a coolant gland that stores the coolant and that receives pressurized air from a source and feeds a mixture of air and coolant through the coolant passage. The chip exhaust port is preferably on an opposite side of the cutter from the coolant passage, so that the spray of coolant and air tends to blow the cut chips out the chip exhaust port.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a perspective view of a drilling apparatus in accordance with one embodiment of the invention, shown clamping a workpiece to be drilled;

FIG. 2 is an exploded perspective view of the apparatus;

FIG. 3 is a side elevation of the apparatus;

FIG. 4 is a top elevation of the apparatus;

FIG. 5 is a top elevation of the first clamping member of the apparatus;

FIG. 6 is a cross-sectional view along line 6—6 of FIG. 5, showing the coolant passage and chip exhaust port in the first clamping member.

DETAILED DESCRIPTION OF THE DRAWINGS

Figure 7:
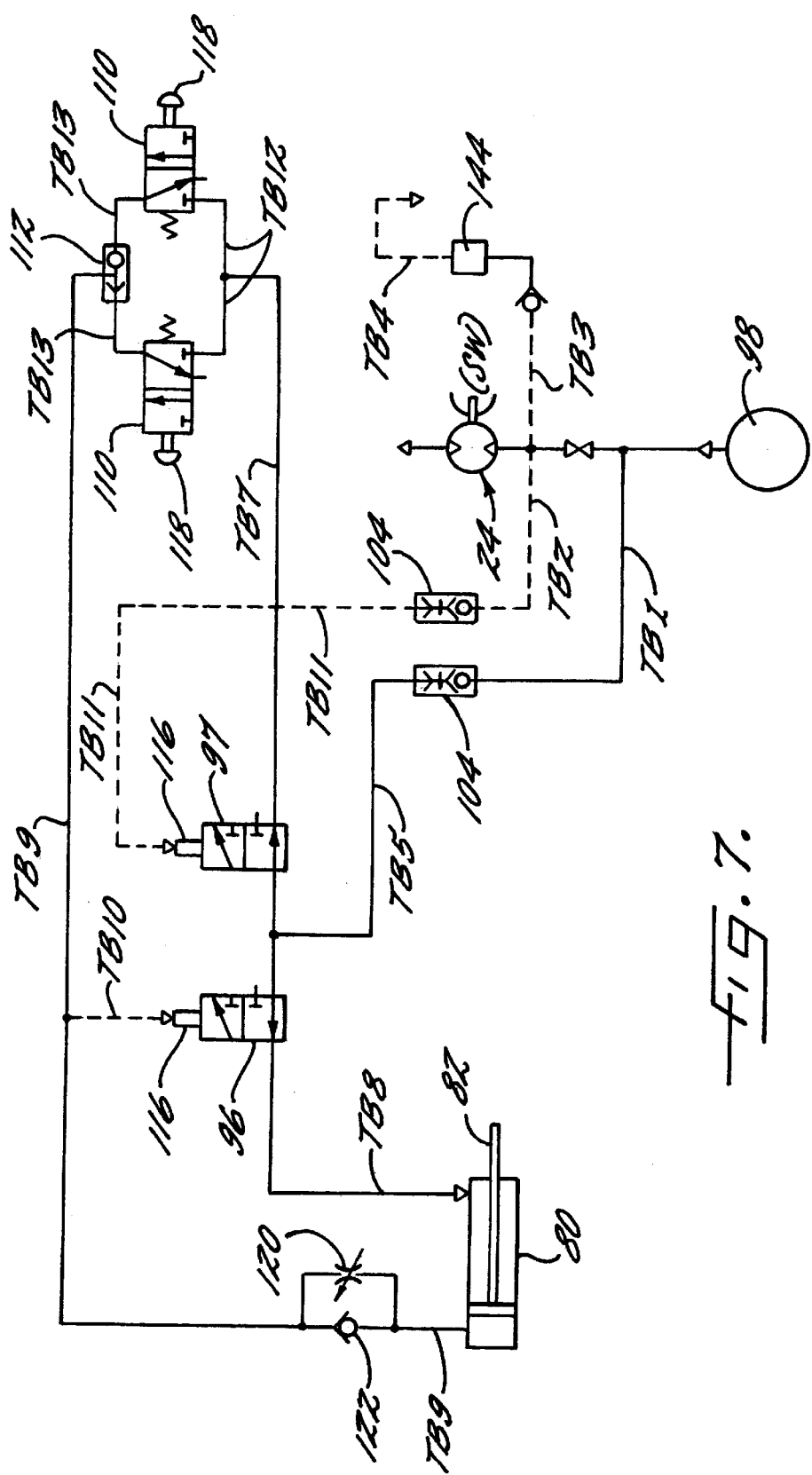
FIG. 7 is a circuit diagram showing the fluid circuit of the apparatus.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

One embodiment of a drilling apparatus in accordance with the present invention is depicted in the drawings and is broadly designated by reference numeral 20. With reference to FIGS. 1–4, the apparatus 20 includes a drill motor assembly 22 comprising an integral drill motor and cutter drive mechanism 24 that operates on pressurized air from a suitable source. An exemplary drill motor and cutter drive mechanism that can be used in the apparatus is a Quackenbush 15QDA drill motor manufactured by Cooper Technologies Company of Houston, Tex. The drill motor 24 has a positive spindle-feeding mechanism for rotating a spindle 26 that is adapted to engage a rotary cutter 28. The drill motor includes a gear housing 30 that houses drive and feed gearing (not shown) for rotating the spindle 26 and for advancing and retracting the spindle generally along the direction defined by the longitudinal axis of the spindle and cutter. The drive and feed gearing are adapted to advance the spindle 26 a predetermined axial distance for each revolution of the spindle; for example, the Quackenbush 15QDA drill motor operates at 1650 rpm and advances the spindle 0.003 inch per revolution of the spindle. The drive and feed gearing are also operable to retract the spindle at a rapid rate after a drilling operation has been completed. The drill motor and cutter drive mechanism includes a feed stop bushing 32, bushing retainer cap 34, and feed stop button 36. The feed stop bushing 32 engages the feed screw retract mechanism (not shown) in the drill motor 24 for retracting the spindle after a hole has been drilled. Pressurized air from a suitable source (not shown) is fed to the drill motor 24 through a male quick-disconnect coupling 38, a female tee fitting 40, and a male reducing nipple 42.

The apparatus 20 also includes a clamping mechanism 50 for clamping a workpiece W to be drilled. The clamping mechanism includes a pair of opposed clamping members 52 and 54 that are urged toward each other for clamping the workpiece therebetween. The clamping members comprise thick plate-shaped members formed of a suitably strong material such as aluminum alloy, with 6061- T651 alloy being presently preferred. The first clamping member 52 includes a jaw portion 56 and a mounting plate portion 58 integrally joined to one side of the jaw portion 56. Similarly, the second clamping member 54 includes a jaw portion 60 and an integrally joined mounting plate portion 62. The clamping members 52 and 54 are coupled to each other by a pair of spaced, parallel guide tubes or rods 64 that are received through a pair of spaced apertures 66 in the mounting plate portion 58 of the first clamping member 52 and through a pair of spaced apertures 68 in the mounting plate portion 62 of the second clamping member 54. The guide rods 64 are prevented from sliding relative to the first clamping member 52 by a pair of snap rings 70 attached to each of the guide rods 64 at locations on opposite sides of the first clamping member. Close-tolerance guide bushings 65 are press-fit in the apertures 68 of the second clamping member 54 and the guide rods 64 are slidably received through the guide bushings 65. Thus, the second clamping member 54 can slide along the guide rods 64 toward and away from the first clamping member 52.

The clamping mechanism 50 further includes an actuator for urging the clamping members toward and away from each other, in the form of a fluid-operated cylinder 80, preferably an air cylinder of the double-acting type. The cylinder 80 is mounted on the second clamping member 54 and has a piston rod 82 that extends through a hole in the second clamping member 54 and has a threaded end that is threaded into a nut 84 that is affixed to the first clamping member 52. Thus, when the piston rod 82 is retracted into the cylinder 80, the second clamping member 54 is urged to slide along the guide rods 64 toward the first clamping member 52 such that a workpicce W can be clamped between the jaw portions 56, 60 of the clamping members.

The clamping mechanism 50 preferably also includes one or more springs for constantly urging the clamping members together so that, in the event that the cylinder 80 ceases to provide a force for clamping a workpiece, the apparatus will remain clamped to the workpiece with enough force to prevent the apparatus from inadvertently and unexpectedly falling from the workpiece. In the illustrated embodiment, this is accomplished by a pair of springs 86 that are slidably received over end portions of the guide rods 64 that extend through the second clamping member 54 on the opposite side thereof from the first clamping member 52. The ends of the guide rods 64 pass through a pair of guide bushings 88 located on the opposite side of the second clamping member, and the springs 86 arc received over the guide bushings 88. The ends of the guide rods 64 are threaded, and a nut 90 with a washer 92 is threaded onto each guide rod. The springs 86 are compressed between the nuts and washers 90, 92 and the second clamping member 54 and, therefore, constantly urge the second clamping member 54 toward the first clamping member 52.

The clamping mechanism 50 also includes an associated fluid circuit that incorporates fluid logic for ensuring that the default mode of operation of the cylinder 80 is such that the clamping members 52, 54 are urged together to clamp a workpiece therebetween; positive action on the part of the operator is required in order to cause the cylinder to move the clamping members apart. FIG. 7 depicts the fluid circuit for the apparatus 20. The circuit includes a pair of three-way, normally open, fluid-actuated valves 96 and 97 connected between a suitable source 98 of pressurized air and a lower end and an upper end of the cylinder 80 such that air supplied to the lower end of the cylinder through the valve 96 causes the cylinder 80 to retract the piston rod 82 and urge the clamping members together, and air supplied to the upper end of the cylinder through the valve 97 causes the cylinder to extend the piston rod to urge the clamping members apart. The valves 96 and 97 are mounted on a valve support braccket 100 that is attached to the second clamping member 54 (see FIG. 2). Air is supplied to the inlet sides of the valves 96, 97 through a line TB1 that is connected to the female tee coupling 40 by a male elbow 102, and a line TB5 that connects to the line TB1 at a quick-disconnect coupling 104 and has its opposite end connected to the inlet sides of the normally open valves 96, 97. The guide rods 64 advantageously are hollow tubes, and the line TB5 is routed from the valves 96, 97 through one of the guide tubes 64 to the quick-disconnect coupling 104. The outlet side of the normally open valve 96 is connected by a line TB8 to a male elbow 106 at the lower end of the cylinder 80. Thus, in the normal state of the fluid circuit, pressurized air will be continuously fed from the source 98, through the lines TB1 and TB5 and the valve 96 and through the line TB8 to the lower end of the cylinder 80.

The fluid circuit includes valving for causing the normally open valve 96 to be closed in response to an operator of the apparatus activating a switch and for causing the pressurized air from the source to be directed to the upper end of the cylinder 80 to cause the cylinder to extend the piston rod 82 and thereby move the clamping members apart. More particularly, the circuit includes a pair of control valves 110 connected in parallel with each other. The control valves 110 are 3-way, push-button-actuated, normally closed valves. Inlet sides of the normally closed control valves 110 are connected by a line TB7 to the outlet side of the normally open valve 97, and the inlet side of the valve 97 is connected to the line TB5 at the lower end of the cylinder 80. Thus, the control valves 110 are supplied with pressurized air from the source 98 as long as the valve 97 is open. The outlet sides of the normally closed control valves 110 are connected together by a shuttle valve 112, and the shuttle valve 112 is connected by a line TB9 to the upper end of the cylinder 80. The line TB9 is also connected, by way of a coupler 114, to a line TB10 that leads to a valve actuator 116 for the valve 96. Each of the control valves 110 includes a switch device, preferably a push button 118, for opening the valve. Accordingly, when either of the buttons 118 is pushed, air pressure is routed through the line TB9 and the line TB10 to the actuator 116 of the valve 96, which causes the valve 96 to close, thereby terminating the air supply to the lower end of the cylinder 80. At the same time, air pressure is delivered to the upper end of the cylinder 80 via the line TB9. As a result, the cylinder 80 extends the piston rod 82, thereby causing the clamping members 52, 54 to be moved apart. When the push button 118 of the control valve is released to re-close the control valve and terminate the air supply to the upper end of the cylinder, the valve 96 re-opens so as to reestablish air pressure to the lower end of the cylinder, thereby causing the cylinder to retract the piston rod 82 and move the clamping members 52, 54 back together. The rate of movement of the cylinder 80 when retracting is regulated by an orifice 120 placed in the line TB9 in parallel with a check valve 122. The check valve 122 assures that fluid passes through the orifice 120 when the cylinder is retracting, but allows unimpeded flow in the opposite direction when the cylinder is extending, thereby enabling rapid opening but controlled, slower closing of the clamping mechanism.

The valve 97 is a safety valve that prevents an operator from unclamping the clamping mechanism when the drill motor is operating. The valve 97 includes an actuator 116 that is connected by a line TB11 to a quick-disconnect coupling 104, which in turn is connected by a line TB2 to the air supply of the drill motor downstream of the drill motor switch SW that turns the drill on. When the drill is operating, air is supplied to the actuator 116 of the safety valve 97 so as to cause the valve to close. This takes the control valves 110 effectively out of the circuit so that they cannot be operated to unclamp the clamping mechanism.

The drill motor 24 of the apparatus is affixed to the clamping member 52 by means of a quick-disconnect coupling so that the drill motor can be easily disconnected from the clamping mechanism for replacing the cutter or the motor. More specifically, the drill motor 24 is affixed to the clamping member 52 by an indexer collar 124, which is essentially a nut. The apparatus includes a nose adapter 126 that is externally threaded and is screwed into one end of a nose piece assembly 128 that is internally threaded. The opposite end of the nose piece assembly is externally threaded and is screwed into one end of a nose piece interface 130 that is affixed to the first clamping member 52. Thus, the nose adapter 126 is fixed to the clamping member 52. The indexer collar 124 engages the nose adapter 126 and screws onto a fitting on the drill motor so as to fasten the clamping member 52 to the drill motor. Thus, the drill motor can be removed from the clamping mechanism simply by unscrewing the indexer collar 124 from the motor. Advantageously, the indexer collar 124 also enables the drill motor 24 to be fixed in various positions with respect to the clamping member 52; that is, the drill motor 24 can be rotated relative to the clamping member 52 about an axis coinciding with the axis of the cutter 28 and can be fixed in any of a plurality of rotated positions that are angularly spaced apart, for example in 45° increments. This allows the motor 24 to be placed in a suitable position enabling the apparatus to be positioned in tight spaces between structural members of the structure being assembled.

The tubular portion of the nose piece interface 130 is received into a bore 132 (FIG. 6) that extends partially through the thickness of the jaw portion 56 of the first clamping member. This bore 132 connects coaxially with a smaller-diameter bore 134 that extends through the remainder of the thickness of the jaw portion. The bore 134 is somewhat larger in diameter than the rotary cutter 28. For example, when the rotary cutter has a diameter of 0.376 inch, the bore 134 can have a diameter of 0.390 inch.

The nose piece assembly 128 includes a drill guide bushing (not shown) press fit therein for receiving the cutter 28 therethrough and for guiding the cutter 28 so that the cutter is advanced and retracted along an axis that is normal to the clamping surfaces of the clamping members 52, 54 and is parallel to the direction along which the clamping member 54 slides on the guide rods 64. When the cutter feed mechanism is activated, the cutter 28 is advanced through the nose piece assembly 128 and through the guide bushing thereof, and through the bore 134 in the clamping member 52 such that the cutter drills a hole through a workpiece clamped between the clamping members 52, 54. As previously noted, the cutter feed mechanism of the drill motor 24 advantageously is of the floating-spindle type, which allows the cutter 28 to undergo a limited degree of lateral movement so as to find the center of the drill guide bushing in the nose piece assembly 128. Accordingly, the cutter 28 is guided to precisely follow the drill guide bushing without binding therein.

The first clamping member 52 includes a coolant passage 140 (FIG. 6) that opens into the bore 134 through which the cutter passes. The coolant passage 140 is supplied with a mixture of pressurized air and cooling and lubricating fluid by a line TB4 (FIG. 2) that connects to a coolant gland 144 containing a quantity of the fluid. The coolant gland 144 is supplied with pressurized air from the source 98 via a line TB3. Thus, a spray of the air-coolant mixture is directed into the bore 134 so as to impinge upon the cutter 28 as it passes therethrough, thereby cooling and lubricating the cutter.

The first clamping member advantageously also includes a chip exhaust port 146 extending laterally outward from the bore 134 on an opposite side thereof from the coolant passage 140. The exhaust port 146 allows cut chips to exhaust therethrough so that the chips tend not to fly in all directions during a drilling operation. By placing the chip exhaust port 146 on a diametrically opposite side of the cutter from the coolant passage 140, the spray of air-coolant mixture tends to blow the chips out the exhaust port 146.

The apparatus 20 also includes an alignment device mounted in the second clamping member 54 for aligning the apparatus with a pre-formed pilot hole in the workpiece W. The alignment device comprises a spring-loaded plunger 150 that is contained within a housing 152 that in turn is mounted within a hole 154 formed through the jaw portion of the second clamping member 54. A spring 156 is slidably received over the plunger 150 and compressed between an end wall of the housing 152 and an enlarged button 158 formed on the end of the plunger, such that the button 158 normally projects out from the second clamping member toward the first clamping member. The upper end of the housing 152 extends above the second clamping member 54 and is secured with a nut 160 and washer 162. The upper end of the plunger 150 extends through a hole in the end wall of the housing 152 and has a snap ring 164 secured thereto for retaining the plunger in the housing. The button 158 of the plunger is sized to fit within a pilot hole that is formed in the part of the workpiece that is against the second clamping member 54, thereby locating the apparatus relative to the pilot hole. When the tip end of the cutter 28 breaks through the thickness of the workpiece to the pilot hole, the tip end depresses the plunger 150 into the housing 152 so that the cutter tip can exit the opposite side of the workpiece. Advantageously, the internal diameter of the housing 152 is substantially larger than the diameter of the cutter so that, in the event of slight misalignment between the cutter and the housing, the cutter will not contact the walls of the housing. As an example, where the cutter has a diameter of 0.376 inch, the housing internal diameter is about 0.410 inch. By precisely guiding the advancement of the cutter 28 via the nose piece assembly 128 as previously described, and providing the oversize housing 152, the life of the cutter can be extended in that the cutter is less likely to be worn by contact with the housing or by binding in the drill guide.

The housing 152 has a substantial depth and the plunger 150 can be depressed into the housing such that a substantial lengthwise extent of the cutter 28 can enter the housing. This is advantageous because it enables the apparatus 20 to be used for drilling workpieces of various thicknesses (e.g., about 0.5 inch to about 1.0 inch) while using a fixed feed stroke of the cutter 28. The cutter 28 cannot bottom out in the housing 152 even when the workpiece thickness is at the low end of the thickness range. Accordingly, there is no need for the operator to carefully observe the drilling operation and to manually retract the cutter when it breaks through the opposite side of the workpiece so as to avoid bottoming out the cutter and possibly damaging it, as is necessary with some prior drilling devices. Instead, the apparatus can include an automatically retracting drill motor that retracts the cutter after it has gone through a predetermined fixed stroke. A further advantage that accrues from the use of the deep housing 152 is that there is no need to carefully adjust the axial position of the cutter when it is installed, and therefore the apparatus is relatively easy to set up when a cutter is replaced.

The apparatus 20 preferably also includes a handle 170 mounted on the second clamping member 54 to facilitate grasping the apparatus when positioning it and clamping it to a workpiece. Advantageously, the control valves 110 are mounted inside the handle 170 and the push buttons 118 for the two control valves protrude out from the opposite ends of the handle. Thus, it is easy for a user grasping the handle with either the right hand or the left hand to push one of the buttons 118 with the thumb of the grasping hand so as to cause the cylinder 80 to move the clamping members apart so that the workpiece parts to be drilled can be positioned between the jaw portions of the clamping members. Once the apparatus is in the desired location, the user releases the push button 118 to cause the clamping members to clamp the workpiece therebetween.

From the foregoing, it will be appreciated that the apparatus 20 made in accordance with the principles of the present invention enables a number of distinct advantages to be attained. For instance, the drill motor 24 can be easily and quickly disconnected from the clamping mechanism 50 by unscrewing the indexer collar 124 and disconnecting the quick-disconnect fluid couplings 104, so that the cutter and/or the motor can be easily replaced when needed. The drill motor assembly 22 can also be rotated relative to the clamping mechanism 50 and positively fixed in a selected orientation, by virtue of the indexer collar 124. The apparatus is easy to set up after a cutter or motor replacement, in that there is no need to carefully adjust the axial position of the cutter 28 relative to the clamping mechanism, since the cutter can extend into the deep housing 152 for the spring-loaded plunger 150. The ability of the cutter to extend into the housing 152 also enables the apparatus to be used for drilling workpieces of substantially different thicknesses with a constant feed stroke of the cutter, which in turn allows an automatic-retracting drill motor to be used. Moreover, the apparatus does not require any difficult procedure for aligning the cutter 28. Precise, repeatable cutter alignment is assured by the floating spindle-type cutter drive mechanism of the drill motor and the nose piece/drill guide assembly 128 in the first clamping member 52 that precisely guides the cutter, and by the precise positioning of the second clamping member 54 relative to the first clamping member 52 provided by the guide tubes 64 and the close-tolerance guide bushings 65 through which they are received.

The apparatus also enhances convenience and safety of operation of the clamping mechanism by virtue of the fluid circuit logic, which defaults to a clamped condition, and the one or more springs 86 that provide a constant clamping force sufficient to keep the apparatus secured to a workpiece even if the cylinder 80 ceases operating. The clamping mechanism can be easily unclamped when desired, by pushing either of the buttons 118 for the twin control valves 110. The buttons 118 are conveniently mounted on opposite ends of the handle 170 so that the operator does not have to let go of the handle to operate them. The control valves are rendered inoperative by the safety valve 97 during a drilling operation so that the apparatus cannot be unclamped while the cutter is being rotated and advanced.

Many modifications and other embodiments of the invention will come to mind to one skilled in the art to which this invention pertains having the benefit of the teachings presented in the foregoing descriptions and the associated drawings. For example, although the valves 96 and 97 and their associated actuators 116 are shown as discrete valve devices, it will be recognized that alternatively they can be incorporated into an integrated air circuit; such integrated air circuit could be made as a part of the clamping member 54. Other chances to the illustrated embodiment can also be made. Therefore, it is to be understood that the invention is not to be limited to the specific embodiments disclosed and that modifications and other embodiments are intended to be included within the scope of the appended claims. Although specific terms are employed herein they are used in a generic and descriptive sense only and not for purposes of limitation.

What is claimed is:

1. An apparatus for drilling a hole through a workpiece, comprising:

a clamping device for clamping the workpiece, the clamping device comprising first and second opposed clamping members arranged to be movable relatively toward and away from each other, and an actuator operable to urge the clamping members toward each other to clamp the workpiece therebetween;

a drill motor and cutter drive mechanism mounted on the first clamping member and adapted to engage a rotary cutter, the drill motor and cutter drive mechanism being operable to rotate the cutter and to advance and retract the cutter along an axial direction such that the cutter can drill a hole through a thickness of the workpiece clamped between the clamping members;

a cutter guide mounted on the first clamping member, the cutter guide receiving the cutter therethrough and guiding the cutter such that the cutter is advanced and retracted along a cutting axis that extends through the thickness of the workpiece clamped between the clamping members;

a receptacle defined in the second clamping member for receiving an end portion of the cutter such that the cutter can drill a hole entirely through the thickness of the workpiece clamped between the clamping members, the receptacle being aligned along said cutting axis and having a diameter substantially larger than that of the cutter; and a plunger mounted in the receptacle for engaging a pilot hole formed in the workpiece so as to locate the apparatus in a proper location for drilling a hole, the plunger being movable into the receptacle such that the plunger is contacted by and pushed into the receptacle by a tip of the advancing cutter as the tip breaks through the thickness of the workpiece and enters the receptacle.

2. The apparatus of claim 1, wherein the receptacle is defined by a housing that is removably mounted in the second clamping member, the plunger being slidable within the housing.

3. The apparatus of claim 2, wherein the receptacle in the housing has a depth sufficient to enable an end portion of the cutter to enter into the housing.

4. The apparatus of claim 1, further comprising at least one guide member fixed relative to one of the clamping members and slidably received through at least one corresponding aperture in the other clamping member, the at least one guide member fitting closely in the at least one aperture such that the clamping members undergo a substantially pure translation relatively toward and away from each other along a predetermined axis that is parallel to the cutting axis defined by the cutter guide.

5. The apparatus of claim 4, wherein the at least one guide member comprises a pair of spaced, parallel guide rods and wherein the at least one aperture comprises a pair of spaced apertures defined in the other clamping member for receiving the guide rods therethrough.

6. The apparatus of claim 5, wherein the guide rods are fixed to the first clamping member and the apertures are defined in the second clamping member, and wherein the actuator comprises a fluid-operated cylinder mounted to the second clamping member and having a piston member connected to the first clamping member.

7. The apparatus of claim 1, wherein the actuator comprises a fluid-operated cylinder mounted to one of the clamping members and having a piston member connected to the other clamping member, and including a fluid circuit for supplying fluid to the cylinder, the fluid circuit having a control valve which, in a normal inactivated position thereof, causes fluid to be supplied to a first side of the actuator such that the actuator urges the clamping members together to clamp the workpiece therebetween.

8. The apparatus of claim 7, wherein the control valve is configured to be movable by a user of the apparatus into an activated position so as to cause fluid to be supplied to a second side of the actuator such that the actuator urges the clamping members away from each other to release the apparatus from the workpiece.

9. The apparatus of claim 8, wherein the fluid circuit includes a safety valve operatively coupled to the drill motor such that the safety valve causes fluid supply to the control valve to be terminated when the drill motor is operating, whereby the control valve is rendered inoperative so that the clamping mechanism cannot be released while the cutter is being rotatably driven.

10. The apparatus of claim 1, further comprising at least one spring connected between the clamping members for constantly urging the clamping members toward each other such that the apparatus remains secured to the workpicce in the event that the actuator ceases to operate.

11. The apparatus of claim 1, further comprising a coolant passage defined in the first clamping member for spraying a cooling and lubricating fluid onto the cutter as the cutter passes through the first clamping member.

12. The apparatus of claim 1, further comprising a chip exhaust port defined in the first clamping member on one side of the cutter for exhausting cut chips therethrough.

13. The apparatus of claim 12, further comprising a coolant gland for storing a quantity of a cooling and lubricating fluid and operable to receive pressurized air, and a coolant passage defined in the first clamping member, the coolant gland being operable to feed a mixture of air and cooling and lubricating fluid through the coolant passage for cooling and lubricating the cutter as the cutter passes through the first clamping member, the coolant passage being arranged to spray the mixture of air and cooling and lubricating fluid from a side of the cutter generally diametrically opposite from the chip exhaust port such that the spray tends to blow chips out the chip exhaust port.

14. An apparatus for drilling a hole through a workpiece, comprising:

a clamping device for clamping the workpiece, the clamping device comprising first and second opposed clamping members arranged to be translatable relatively toward and away from each other, and a fluid-operated cylinder mounted to one of the clamping members and having a piston member connected to the other clamping member;

a drill motor and cutter drive mechanism mounted on the first clamping member and adapted to engage a rotary cutter, the drill motor and drive mechanism being operable to rotate the cutter and to advance and retract the cutter along an axial direction such that the cutter can drill a hole through a thickness of the workpiece clamped between the clamping members; and a fluid circuit for supplying fluid to the cylinder, the fluid circuit having a control valve which, in an inactivated position thereof, causes fluid to be supplied to a first side of the cylinder such that the cylinder urges the clamping members together to clamp the workpiece therebetween, the control valve being configured to be movable by a user of the apparatus into an activated position so as to cause fluid to be supplied to a second side of the cylinder such that the cylinder urges the clamping members away from each other to release the apparatus from the workpiece.

15. The apparatus of claim 14, wherein the fluid circuit includes a safety valve operatively coupled to the drill motor such that the safety valve causes supply of fluid to the control valve to be terminated when the drill motor is operating, whereby the control valve is rendered inoperative so that the clamping mechanism cannot be released while the cutter is being rotatably driven.

16. The apparatus of claim 15, further comprising a spring connected between the clamping members for constantly urging the clamping members toward each other such that the apparatus remains secured to the workpiece in the event that the cylinder ceases to operate.

17. The apparatus of claim 14, further comprising a handle connected to the clamping mechanism to facilitate a user grasping the apparatus, and wherein the control valve includes a switch mounted proximate the handle such that the user can operate the switch to activate the control valve while grasping the handle.

18. The apparatus of claim 17, further comprising a second control valve, the two control valves being in parallel in the fluid circuit such that activation of either control valve causes the cylinder to urge the clamping members apart, and including a second switch for the second control valve mounted proximate the handle, the two switches being mounted on opposite sides of the handle such that right-handed and left-handed users can readily operate one of the switches to activate the respective control valve.

19. The apparatus of claim 14, further comprising a pair of spaced, parallel guide rods fixed to one of the clamping members and slidably received through close-fitting apertures defined in the other clamping member such that the relative movement of the clamping members toward and away from each other is constrained to be a substantially pure translation.

20. The apparatus of claim 19, further comprising a pair of springs connected between the guide rods and the other clamping member through which the guide rods are slidably received, the springs constantly urging the clamping members toward each other such that the apparatus remains secured to the workpiece in the event that the cylinder ceases to operate.

* * * * *